(12) United States Patent
Ochoa Munoz et al.

(10) Patent No.: US 10,078,358 B2
(45) Date of Patent: Sep. 18, 2018

(54) SYSTEM AND METHOD FOR REDUCING POWER DELIVERY NETWORK COMPLEXITY THROUGH LOCAL POWER MULTIPLEXERS

(71) Applicant: QUALCOMM Incorporated, San Diego, CA (US)

(72) Inventors: Juan Ochoa Munoz, La Jolla, CA (US); Yuancheng Chris Pan, Saratoga, CA (US); Mikhail Popovich, San Marcos, CA (US); Joon Hyung Chung, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 15/171,851

(22) Filed: Jun. 2, 2016

(65) Prior Publication Data

US 2017/0351315 A1  Dec. 7, 2017

(51) Int. Cl.
  *G06F 1/00* (2006.01)
  *G06F 1/32* (2006.01)

(52) U.S. Cl.
  CPC ............ *G06F 1/324* (2013.01); *G06F 1/3296* (2013.01)

(58) Field of Classification Search
  CPC ........... G06F 1/324; G06F 1/26; G06F 1/3296
  USPC ......................................................... 713/322
  See application file for complete search history.

(56) References Cited

U.S. PATENT DOCUMENTS

| | | | |
|---|---|---|---|
| 8,376,070 B2 | 2/2013 | Waszak et al. | |
| 9,069,552 B2 | 6/2015 | Hiraguchi et al. | |
| 9,184,123 B1 | 11/2015 | Liu | |
| 2006/0055022 A1* | 3/2006 | Nelson | H01L 23/49827 257/691 |
| 2008/0162770 A1* | 7/2008 | Titiano | G06F 1/3203 710/309 |
| 2014/0359311 A1* | 12/2014 | Jahagirdar | G06F 1/26 713/300 |
| 2015/0277530 A1 | 10/2015 | Rathnakar et al. | |

FOREIGN PATENT DOCUMENTS

| | | |
|---|---|---|
| CN | 103746431 A | 4/2014 |
| CN | 205160195 U | 4/2016 |
| EP | 2993421 A1 | 3/2016 |

OTHER PUBLICATIONS

International Search Report and Written Opinion—PCT/US2017/025159—ISA/EPO—Jul. 6, 2017.

* cited by examiner

*Primary Examiner* — Austin Hicks
(74) *Attorney, Agent, or Firm* — Loza & Loza LLP

(57) ABSTRACT

A power delivery network (PDN) including a battery, a set of regulators for generating supply voltages, and an integrated circuit (IC) including power rails configured to receive the supply voltages. The IC further includes an IC chip having a set of cores. The power rails includes a larger rail configured to provide a full range of currents, and the other smaller power rails each configured to provide lower range of currents. The IC includes multiplexers having first inputs coupled respectively to the smaller rails, second inputs coupled to the larger rail, and outputs coupled to the cores. When the smaller rail is able to supply the current needed by a core, the multiplexer is configured to couple the smaller rail to the core. When the smaller rail cannot supply the current needed by the core, the multiplexer is configured to couple the larger rail to the core.

15 Claims, 8 Drawing Sheets

| DCVS TABLE | | | SIZE OF RAIL (NO. OF BGA BALLS) |
|---|---|---|---|
| DCVS LEVEL | VOLTAGE | FREQUENCY | |
| -5 (Super Turbo) | V5 | f5 | 20 |
| -4 (Turbo) | V4 | f4 | 15 |
| -3 (Nominal) | V3 | f3 | 10 |
| -2 (Low Power) | V2 | f2 | 6 |
| -1 (V-Low Pwr) | V1 | f1 | 3 |

SYSTEM AND METHOD FOR REDUCING POWER DELIVERY NETWORK COMPLEXITY THROUGH LOCAL POWER MULTIPLEXERS

BACKGROUND

Field

Aspects of the present disclosure relate generally to power delivery networks (PDNs), and in particular, to a system and method for reducing the complexity of PDNs through the use of local power multiplexers.

Background

Often an integrated circuit (IC), such as a system on chip (SOC), includes multiple power rails for independently providing supply voltages to various cores of the IC. A set of regulators are typically provided to generate the supply voltages for the cores.

The voltage level of the supply voltage applied to a core depends on the particular operation performed by the core. If the core is performing a demanding operation (e.g., processing substantial amount of data at a fast rate), the supply voltage applied to the core is relatively high. If, on the other hand, the core is performing a not-so-demanding operation (e.g., simply retaining data in memory cells), the supply voltage applied to the core is relatively low.

In addition, the power rails that provide the supply voltages to the respective cores need to be sized to supply the needed current for the cores. As all the cores may need to perform demanding operations, the power rails need to be sized to handle the worst case or highest current required by the cores. If there are multiple power rails in an IC, and each of the power rails need to be designed for the worst case highest current, the amount of area needed to implement the multiple power rails may be substantially large.

Thus, there is a need to reduce the overall or aggregate size of the power rails, while still providing the currents or power needed by the various cores.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

An aspect of the disclosure relates to an apparatus including a core; a first power rail configured to supply current to the core based on one of a first set of dynamic clock voltage scaling (DCVS) levels; a second power rail configured to supply current to the core based on one of a second set of DCVS levels, wherein the second set of DCVS levels is different than the first set of DCVS levels; a multiplexer including a first input and a second input coupled respectively to the first power rail and the second power rail, and an output coupled to the core; and a DCVS controller configured to: receive a request for a selected DCVS level from the core; determine whether the first power rail is capable of supplying current to the core based on the selected DCVS level; and control the multiplexer to couple the first input to the output in response to determining that the first power rail is capable of supplying current to the core based on the selected DCVS level; or control the multiplexer to couple the second input to the output in response to determining that the first power rail is not capable of supplying current to the core based on the selected DCVS level.

Another aspect of the disclosure relates to a method including receiving a request for a selected DCVS level from a core; determining whether a first power rail is capable of supplying current to the core based on the selected DCVS level; and coupling the first power rail to the core in response to determining that the first power rail is capable of supplying current to the core based on the selected DCVS level; or coupling a second power rail to the core in response to determining that the first power rail is not capable of supplying current to the core based on the selected DCVS level.

Another aspect of the disclosure relates to an apparatus including means for receiving a request for a selected DCVS level from a core; means for determining whether a first power rail is capable of supplying current to the core based on the selected DCVS level; means for coupling the first power rail to the core in response to determining that the first power rail is capable of supplying current to the core based on the selected DCVS level; or means for coupling a second power rail to the core in response to determining that the first power rail is not capable of supplying current to the core based on the selected DCVS level.

Another aspect of the disclosure relates to an apparatus including a set of cores; a set of first power rails; a second power rail; a set of multiplexers, wherein each multiplexer of the set comprises a first input coupled to a corresponding first power rail of the set of first power rails, a second input coupled to the second power rail, and an output coupled to a corresponding core of the set of cores; and a controller configured to control the set of multiplexers based on requests for dynamic clock voltage scaling (DCVS) levels received from the set of cores, respectively.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the description embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

For operating an integrated circuit (IC), such as a System on Chip (SOC), in a power efficient manner, the IC is typically designed to have multiple power rails. For example, there may be a power rail for independently providing a supply voltage to a processing core (e.g., such as a central processing unit (CPU), graphics processor, or others). There may be other power rails for independently providing supply voltages to other associated cores, such as memory cores.

As mentioned above, using multiple power rails, an IC may be operated in a power efficient manner. For example, the respective supply voltages for cores that are not as active may be reduced. Whereas, the respective supply voltages for cores that are very active may be increased. Accordingly, using independent power rails, the supply voltages for various cores of an IC may be set depending on their respective levels of activity.

Figure 1A:
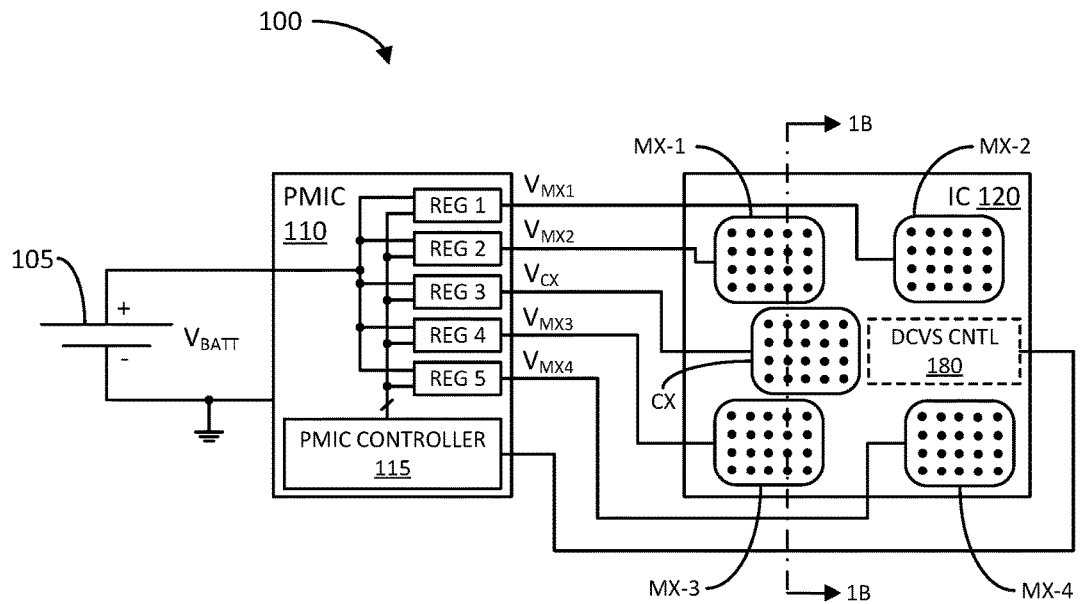
FIG. 1A illustrates a block diagram of an exemplary power delivery network (PDN) in accordance with an aspect of the disclosure.

FIG. 1A illustrates a block diagram of an exemplary power delivery network (PDN) 100 in accordance with an aspect of the disclosure. The PDN 100, generally an apparatus, includes circuitry for providing supply voltages to an IC, such as an SOC. In particular, the PDN 100 includes a battery 105, a power management integrated circuit (PMIC) 110 and an IC 120. The battery 105 is configured to generate a battery voltage $V_{BATT}$.

The PMIC 110 includes a set of regulators REG1 to REG5 and a PMIC controller 115. The regulators REG1 to REG 5 are configured to generate supply voltages $V_{MX1}$, $V_{MX2}$, $V_{CX}$, $V_{MX3}$, and $V_{MX4}$ from the battery voltage $V_{BATT}$ and based on commands received from the PMIC controller 115, respectively.

The IC 120 includes a set of power rails MX-1, MX-2, CX, MX-3, and MX-4 configured to receive the supply voltages $V_{MX1}$, $V_{MX2}$, $V_{CX}$, $V_{MX3}$, and $V_{MX4}$ from the PMIC 110, respectively. In this example, the power rails MX-1, MX-2, CX, MX-3, and MX-4 provide supply voltages $V_{MX1}$, $V_{MX2}$, $V_{CX}$, $V_{MX3}$, and $V_{MX4}$ to respective cores of the IC 120, such as a first memory core 152, a second memory core 154, a processor core 156, a third memory core 158, and a fourth memory core 160, respectively (See e.g., FIG. 2).

The IC 120 further includes a power controller 180, such as a dynamic clock voltage scaling (DCVS) controller, for controlling the supply voltages $V_{MX1}$, $V_{MX2}$, $V_{CX}$, $V_{MX3}$, and $V_{MX4}$ provided to the various cores memory 152, memory 154, processor 156, memory 158, and memory 160, respectively. The DCVS controller 180 controls the supply voltages $V_{MX1}$, $V_{MX2}$, $V_{CX}$, $V_{MX3}$, and $V_{MX4}$ by sending commands to the PMIC controller 115 of the PMIC 110. Based on these commands, the PMIC controller 115 instructs the various regulators REG-1 to REG-5 to generate the appropriate supply voltages $V_{MX1}$, $V_{MX2}$, $V_{CX}$, $V_{MX3}$, and $V_{MX4}$, respectively.

Figure 1B:
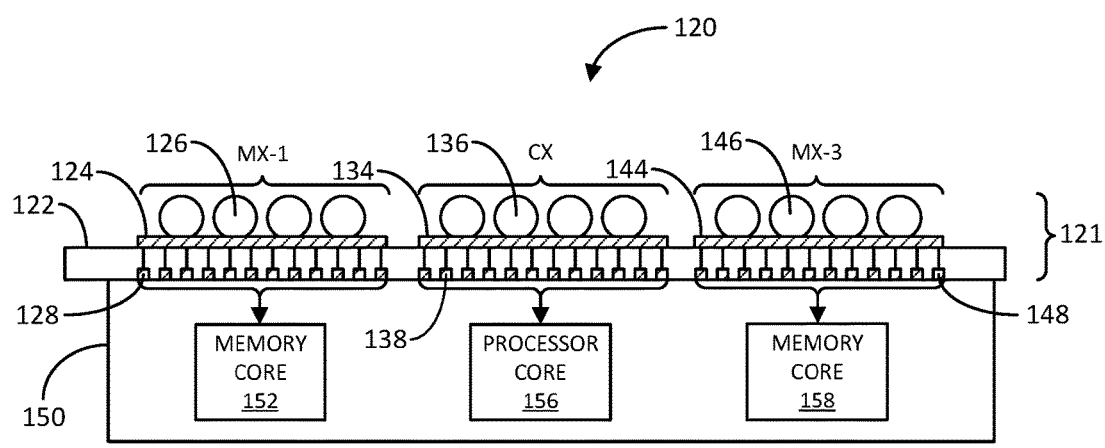
FIG. 1B illustrates a cross-sectional view and block diagram of an exemplary integrated circuit (IC) in accordance with another aspect of the disclosure.

FIG. 1B illustrates a cross-sectional view and block diagram of the IC 120 in accordance with another aspect of the disclosure. The cross-sectional view is taken off line 1B-1B shown in FIG. 1A. It shall be understood that the cross-sectional view of the IC 120 is representative and is not to scale. The IC 120 includes an IC package 121 including an electrically-insulating enclosure 122. Only a top portion of the IC package 121 is shown for ease of illustration. The IC package 121 also includes a set of separate metallized pads 124, 134, and 144 formed on an exterior surface of the electrically-insulating enclosure 122. The IC package 121 further includes sets of ball grid arrays (BGAs) balls 126, 136, and 146 disposed on and electrically attached to the set of metallized pads 124, 134, and 144, respectively.

The IC 120 further includes an IC chip 150 enclosed by the IC package 121. As shown, the IC chip 150 includes the memory core 152, the processor core 156, and the memory core 158. As the other memory cores 154 and 160 may not be situated along line 1B-1B depicted in FIG. 1A, these memory cores are not shown in FIG. 1B, although they are present in the IC 150.

The IC Package 121 also includes sets of bumps 128, 138, and 148 disposed on an interior surface of the electrically-insulating enclosure 122. The sets of bumps 128, 138, and 148 are electrically coupled to the metallized pads 124, 134, and 146 via internal metallization traces within the electrical-insulating enclosure 122, respectively. The combination of the BGA balls 126, metallized pad 124, and bumps 128 forms a power rail MX-1. Similarly, the combination of the BGA balls 136, metallized pad 134, and bumps 138 forms a power rail CX. And, the combination of the BGA balls 146, metallized pad 144, and bumps 148 forms a power rail MX-3.

The power rail MX-1 provides supply voltage $V_{MX1}$ to the memory core 152. The power rail CX provides supply voltage $V_{CX}$ to the processor core 156. And, the power rail MX-3 provides supply voltage $V_{MX3}$ to the memory core 158. The maximum current or power supplied from the power rails MX-1, CX, and MX-3 to the cores 152, 156, and 158 depends on the size (e.g., number of BGA balls) of each of the power rails MX-1, CX, and MX-3.

For instance, the power P supplied to a core may be approximately given by the following equation:

$$P = V^2 * f * C$$

Where V is the supply voltage provided to the core via the corresponding power rail, f is the frequency of a clock signal provided to the core, and C is the effective capacitance of the core as seen from the corresponding power rail.

Generally, there are a set of available supply voltage V and clock frequency f for supplying power to each of the cores. Each of the available voltage-frequency pair is often referred to as a dynamic clock voltage scaling (DCVS) level or dynamic voltage and frequency scaling (DVFS) level (referred to hereinafter as "DCVS"). Each of the set of available DCVS levels include a supply voltage V and clock frequency f that have been selected or calibrated to supply a particular power to the corresponding core.

As discussed in more detail below, the set of DCVS levels may range from a relatively low power DCVS level (e.g., DCVS-1 level) used by a core to perform low power operations (e.g., retain data in memory) to a high power DCVS level (e.g., DCVS-5 level) used by a core to perform a high power operations (e.g., high speed data processing operation). As each of the cores 152, 156, and 158 (as well as the others 154 and 158) may need to use the highest available DCVS level, the corresponding power rails need to be configured large enough to supply the necessary power or current in accordance with the DCVS level.

Depending on the specific operation it is about to perform, one of the cores 152, 154, 156, 158 or 160 sends a request to the DCVS controller 180 for a particular DCVS level. In response, the DCVS controller 180 sends a command to the PMIC controller 115 to instruct the corresponding regulator to generate a supply voltage corresponding to the requested DCVS level. Additionally, as discussed in more detail below with respect to FIG. 2, the DCVS controller 180 sends a command to a corresponding clock source to generate a clock signal with a frequency corresponding to the requested DCVS level.

Figure 2:
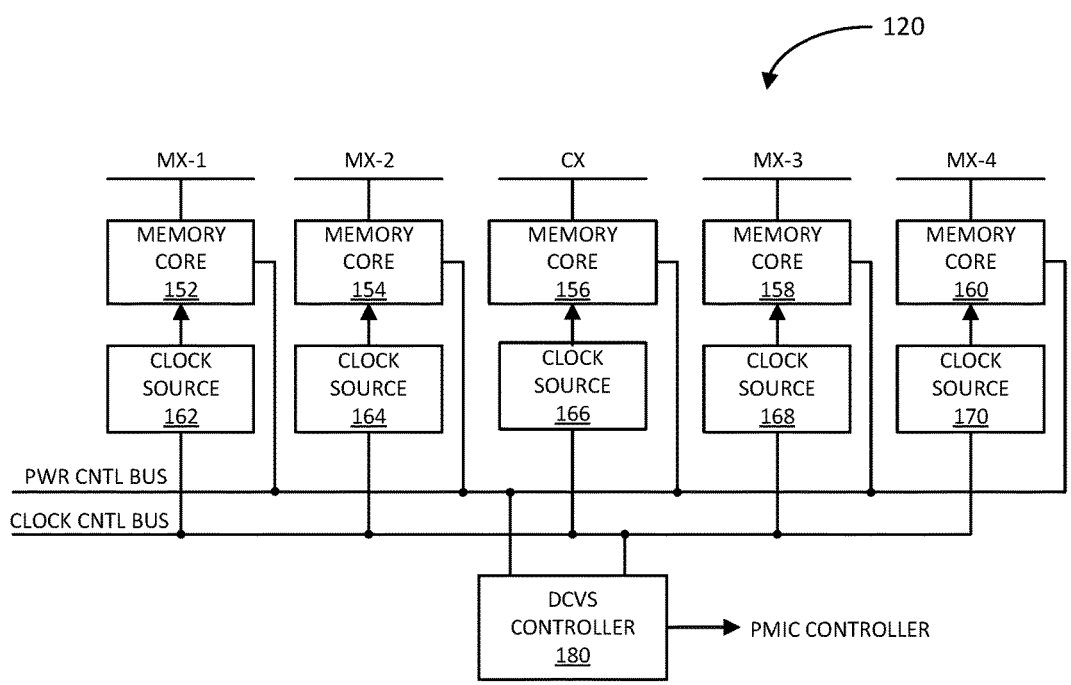
FIG. 2 illustrates a schematic diagram of an exemplary integrated circuit (IC) in accordance with another aspect of the disclosure.

FIG. 2 illustrates a schematic diagram of the IC 120 in accordance with another aspect of the disclosure. As mentioned above, in addition to controlling the supply voltages $V_{MX1}$, $V_{MX2}$, $V_{CX}$, $V_{MX3}$, and $V_{MX4}$ for the various cores memory 152, memory 154, processor 156, memory 158, and memory 160, the DCVS controller 180 also controls the frequencies of clock signals provided to the cores memory 152, memory 154, processor 156, memory 158, and memory 160 by corresponding clock sources 162, 164, 166, 168, and 170, respectively. Generally, the frequency of the clock signal supplied to a core depends on the level of activity of the core (e.g., very active translates to high clock frequency, not very active translates to low clock frequency).

Figures 3, 4:
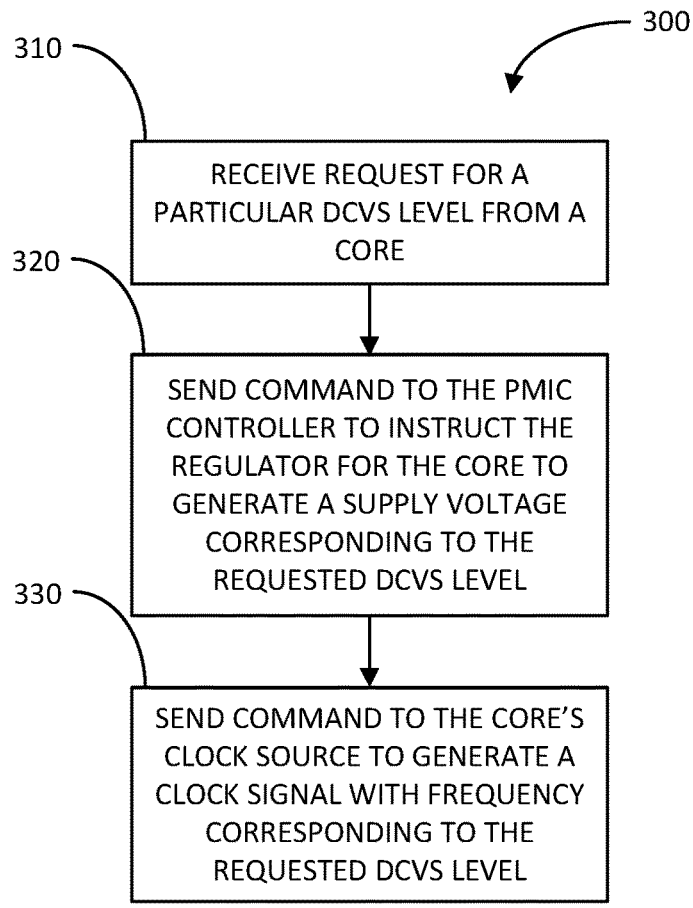
FIG. 3 illustrates a flow diagram of an exemplary method of managing power supplied to a core in accordance with another aspect of the disclosure.
FIG. 4 illustrates a table (set) of available DCVS levels in accordance with another aspect of the disclosure.

FIG. 3 illustrates a flow diagram of an exemplary method 300 of managing power supplied to a core in accordance with another aspect of the disclosure. The method 300 may be performed by the DCVS controller 180. According to the method 300, the DCVS controller 180 receives a request from one of the cores (e.g., memory 152) via a power control bus, wherein the request indicates a particular DCVS level (block 310). In response, the DCVS controller 180 sends a command to the PMIC controller 115 to instruct the corresponding regulator (e.g., REG-1) to generate a supply voltage (e.g., $V_{MX1}$) at a voltage level corresponding to the requested DCVS level (block 320). Additionally, the DCVS controller 180 sends a command to the corresponding clock source (e.g., clock source 162) to generate a clock signal with a frequency corresponding to the requested DCVS level (block 330).

FIG. 4 illustrates a table (set) of available DCVS levels in accordance with another aspect of the disclosure. In this example, as indicated in the left-most column of the table, the set may include five (5) DCVS levels: DCVS-5 (Super Turbo), DVCS-4 (Turbo), DCVS-3 (Nominal), DCVS-2 (Low Power), and DCVS-1 (Very Low Power). The DCVS-5 to DCVS-1 levels are characterized as having supply voltage-clock frequency pairs V5-f5, V4-f4, V3-f3, V2-f2, and V1-f1, respectively.

The index of the DCVS level indicates the level of power or current supplied to a core. For example, DCVS-5 level pertains to the highest power or current supplied to a core, and DCVS-1 pertains to the lowest power or current supplied to the core. Generally, the supply voltages are ranked in the following order: V5>V4>V3>V2>V1; and the clock frequencies are ranked in the following order: f5>f4>f3>f2>f1.

For instance, if a core needs to perform a demanding activity in a relatively fast manner (e.g., process substantial amount of data at a high rate), the core may request DCVS-5 level so that it receives the appropriate supply voltage and clock frequency to adequately perform the activity. If, on the other hand, the core needs to perform a less demanding activity (e.g., simply retain data in memory), the core may request DCVS-1 level so that it receives the appropriate supply voltage and clock frequency to adequately perform the activity in a power efficient manner.

Generally, as the various cores memory 152, memory 154, processor 156, memory 158, and memory 160 need to be able to receive the highest DCVS level, the corresponding power rails MX-1, MX-2, CX, MX-3, and MX-4 need to handle the current associated with the highest DCVS level. With reference again to FIGS. 1A-1B, as discussed above, each power rail of the IC 120 may be implemented as a metallized pad with a ball grid array (BGA) on an IC package. The size of the metallized pad and number of BGA balls depend on the current handling capability.

In this example, as indicated in the right-most column of the table depicted in FIG. 4, a power rail configured to handle the current for DCVS-5 level should include a metallized pad with at least 20 BGA balls; a power rail configured to handle the current for DCVS-4 level should have a metallized pad with at least 15 BGA balls; a power rail configured to handle the current for DCVS-3 level should have a metallized pad with at least 10 BGA balls; a power rail configured to handle the current for DCVS-2 level should have a metallized pad with at least 6 BGA balls; and a power rail configured to handle the current for DCVS-1 level should have a metallized pad with at least 3 BGA balls.

As indicated above, since each of the cores memory 152, memory 154, processor 156, memory 158, and memory 160 may require the highest DCVS level 5, the power rail for each of the cores is configured to have a metallized pad with 20 BGA balls. As, in this example, the IC 120 includes five (5) power rails MX-1, MX-2, CX, MX-3, and MX-4, a total of five separate metallized pads with 100 aggregate BGA balls are required to implement these power rails.

It would be desirable to reduce the size of the IC package (as well as the size of the corresponding IC chip), while providing the various cores access to all of the available DCVS levels.

In summary, for some of the cores (e.g., memory 152, memory 154, memory 158, and memory 160), the size of the power rails (e.g., MX-1, MX-2, MX-3, and MX-4) are each reduced (e.g., smaller metalized pad, lower number of BGA balls, and lower number of bumps) to handle only a subset of the available DCVS levels (e.g., DCVS levels 1-3) (referred to herein as the "smaller" power rails). Although memory cores are used to exemplify the concepts of the invention, it shall be understood that it can be applied to any type of core.

For a particular core (e.g., the processor 156), the power rail (e.g., CX) may be incremented in size (larger metalized pad, higher number of BGA balls, and higher number of bumps) (referred to herein as the "larger" power rail). The larger power rail may be configured to handle all (or a higher subset) of the available DCVS levels (e.g., DCVS levels 1-5). The larger power rail is also routed proximate the smaller power rails (e.g., MX-1, MX-2, MX-3, and MX-4).

Additionally, a power multiplexer associated with each of the smaller power rails is provided. Each power multiplexer ("mux") includes a first input coupled to the corresponding smaller power rail and a second input coupled to the larger power rail. The output of the power multiplexer is coupled to the corresponding core.

When a core needs a DCVS level that the smaller power rail is able to handle (e.g., one of DCVS levels 1-3), the power multiplexer is configured to couple its first input to its output, allowing the smaller power rail to provide the supply voltage to the core. If, on the other hand, the core needs a DCVS level that the smaller power rail cannot provide (e.g., one of DVCS levels 4-5), the power multiplexer is configured to couple its second input to its output, allowing the larger power rail to provide the supply voltage to the core.

The IC package and corresponding IC chip may be made smaller by reducing the size of the power rails (metallized pads, BGA balls, and bumps) for multiple cores, and increasing the size (by a lesser degree as compared to the aggregate reduction in the size of the smaller power rails) to one of the power rails. Through the use of the power multiplexer, each core is able to access all available DCVS levels. An additional benefit is that the increased size of the larger power rail allows for it to handle current higher than the rated current for the highest DCVS level.

The following provides exemplary embodiments that implement the aforementioned concepts.

Figure 5A:
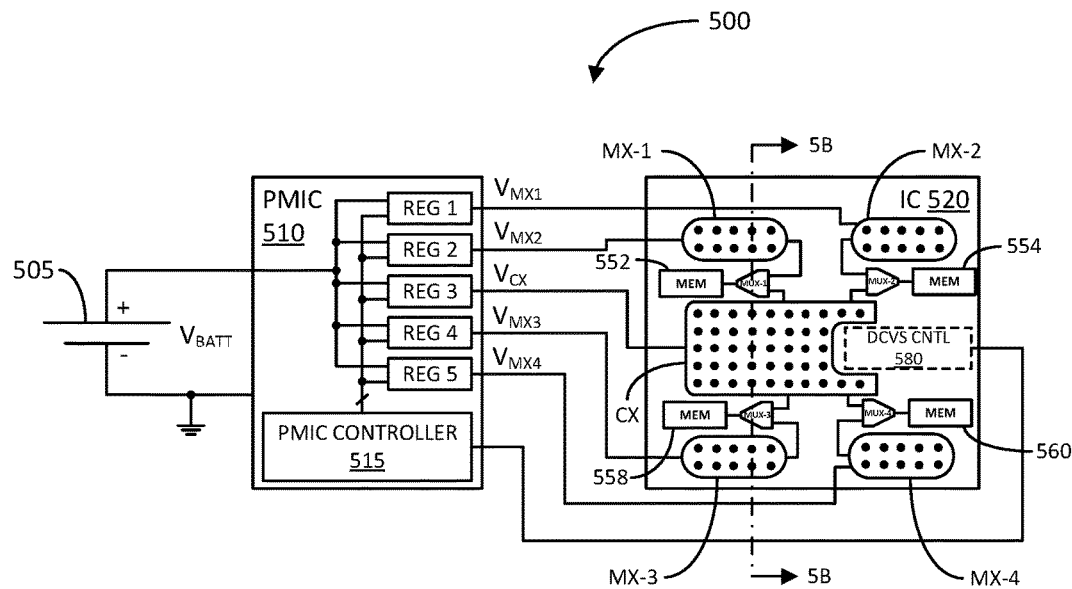
FIG. 5A illustrates a block diagram of another exemplary power delivery network (PDN) in accordance with another aspect of the disclosure.

FIG. 5A illustrates a block diagram of an exemplary power delivery network (PDN) 500 in accordance with another aspect of the disclosure. The PDN 500 includes a battery 505, a PMIC 510, and an IC 520.

The battery 505 is configured to generate a battery voltage $V_{BATT}$. The PMIC 510 includes regulators REG-1 to REG-5 configured to generate supply voltages $V_{MX1}$, $V_{MX2}$, $V_{CX}$, $V_{MX3}$, and $V_{MX4}$ from the battery voltage $V_{BATT}$, and a PMIC controller 515 to control the levels of the supply voltages $V_{MX1}$, $V_{CX}$, $V_{MX3}$, and $V_{MX4}$.

The IC 520 includes power rails MX-1, MX-2, CX, MX-3, and MX-4 configured to receive the supply voltages $V_{MX1}$, $V_{MX2}$, $V_{CX}$, $V_{MX3}$, and $V_{MX4}$ from the PMIC 510, and provide the supply voltages to corresponding cores memory 552, memory 554, processor 556, memory 558, and memory 560, respectively. The IC 520 includes a power (DCVS) controller 580 for sending instructions to the PMCI controller 515 to set the supply voltages $V_{MX1}$, $V_{MX2}$, $V_{CX}$, $V_{MX3}$, and $V_{MX4}$ based on requests for selected DCVS levels received from the cores, respectively.

As illustrated in FIG. 5A, the metalized pads and corresponding BGA balls of the power rails MX-1, MX-2, MX-3, and MX-4 are configured smaller than the metallized pad and corresponding BGA balls of the power rail CX. For example, each of the power rails MX-1 to MX-4 includes a metallized pad with 10 BGA balls. Whereas, the CX power rail includes a metallized pad with 44 BGA balls. As such, the power rails MX-1 to MX-4 are only capable of supporting DCVS levels 1-3. Whereas, the CX power rail is capable of supporting all of the DCVS levels 1-5.

For comparison purposes, the IC 520 includes a total of 84 BGA balls as compared to that of 100 BGA balls for IC 120. Thus, the IC 520 (IC package and chip) may be made much smaller. Additionally, the CX power rail of IC 520 includes 44 BGA balls as compared to the 20 BGA balls of the CX power rail of IC 120. Thus, the CX power rail of IC 520 is able to handle significantly more current than the CX power rail of IC 120.

To allow the memory cores 552, 554, 558, and 560 access to all DCVS levels, the IC 520 includes local power multiplexers mux-1, mux-2, mux-3 and mux-4 with respective first inputs coupled to the power rails MX-1 to MX-4, and respective second inputs coupled to the power rail CX. The power multiplexers mux-1 to mux-4 include outputs coupled to the memory cores 552, 554, 558, and 560, respectively.

Thus, when one of the memory cores 552, 554, 558, and 560 needs a DCVS level that is associated with a current capable of being supplied by a corresponding MX rail (e.g., DCVS levels 1-3), the corresponding power multiplexer is configured to couple its first input to its output to allow the corresponding MX rail to provide the supply voltage associated with the requested DCVS level to the core. If, on the other hand, one of the memory cores 552, 554, 558, and 560 needs a DCVS level that is associated with a current that cannot be provided by the corresponding MX rail (e.g., DCVS levels 4-5), the corresponding power multiplexer is configured to couple its second input to its output to allow the CX power rail to provide the supply voltage for the requested DCVS level to the core.

Figure 5B:
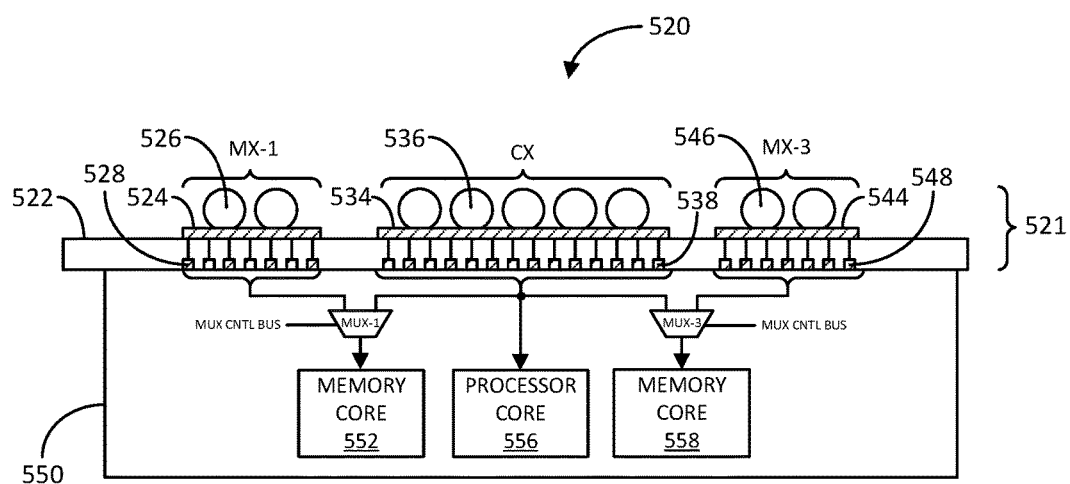
FIG. 5B illustrates a cross-sectional view and block diagram of an exemplary IC in accordance with another aspect of the disclosure.

FIG. 5B illustrates a cross-sectional view and block diagram of the IC 520 in accordance with another aspect of the disclosure. The cross-sectional view is taken off line 5B-5B shown in FIG. 5A. It shall be understood that the cross-sectional view of the IC 520 is representative and is not to scale. The IC 520 includes an IC package 121 having an electrically-insulating enclosure 522. Only a top portion of the IC package 521 is shown for ease of illustration. The IC package 521 also includes a set of separate metallized pads 524, 534, and 544 formed on an exterior surface of the electrically-insulating enclosure 522. The IC package 521 further sets of ball grid arrays (BGAs) balls 526, 536, and 546 disposed on and electrically attached to the set of metallized pads 524, 534, and 544, respectively.

The IC 520 further includes an IC chip 550 enclosed by the IC package 521. As shown, the IC chip 550 includes the memory core 552, the processor core 556, and the memory core 558. As the other memory cores 554 and 560 are not along line 5B-5B depicted in FIG. 5A, these memory cores are not shown in FIG. 5B, although they are present in the IC 550. Additionally, the IC chip 550 includes the power multiplexers mux-1 and mux-3. As the other memory cores 554 and 560 are not along line 5B-5B depicted in FIG. 5A, the corresponding power multiplexers mux-2 and mux-4 are not shown in FIG. 5B, although they are present in the IC 550.

The IC Package 521 also includes sets of bumps 528, 538, and 548 disposed on an interior surface of the electrically-insulating enclosure 522. The sets of bumps 528, 538, and 548 are electrically coupled to the metallized pads 524, 534, and 546 via internal metallization traces within the electrical-insulating enclosure 522, respectively. The combination of the BGA balls 526, metallized pad 524, and bumps 528 forms the power rail MX-1. The combination of the BGA balls 536, metallized pad 534, and bumps 538 forms the power rail CX. And, the combination of the BGA balls 546, metallized pad 544, and bumps 548 forms the power rail MX-3.

The power multiplexer mux-1 includes a first input electrically coupled to the power rail MX-1, a second input electrically coupled to the power rail CX, and an output coupled to the memory core 552. The power rail CX is electrically coupled to the processor core 556. The power multiplexer mux-2 includes a first input electrically coupled to the power rail MX-2, a second input electrically coupled to the power rail CX, and an output coupled to the memory core 558. Both power multiplexers mux-1 and mux-2 are coupled to a multiplexer control bus for controlling the coupling of the selected input to the corresponding output.

Figure 6:
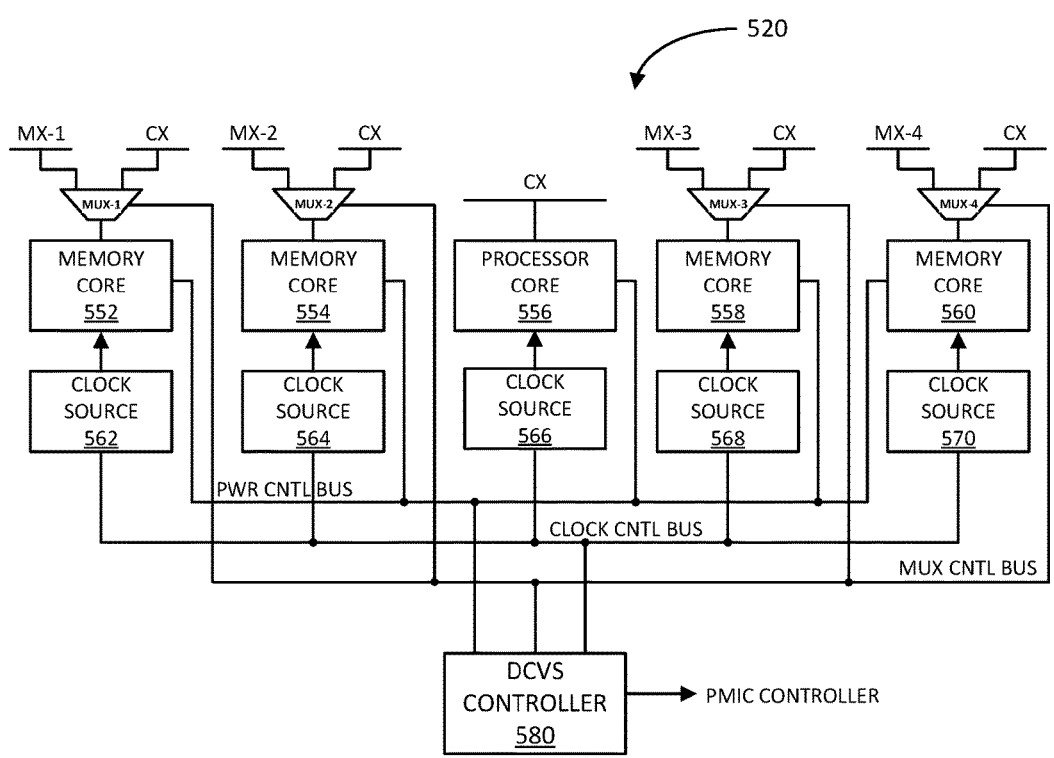
FIG. 6 illustrates a schematic diagram of an exemplary IC in accordance with another aspect of the disclosure.

FIG. 6 illustrates a schematic diagram of the IC 520 in accordance with another aspect of the disclosure. The various memory cores 552, 554, 558, and 560, and processor core 556 communicate DCVS level requests to the DCVS controller 580 via a power control bus. The DCVS controller 580 controls the memory clock sources 562, 564, 568, and 570, and the processor clock source 566 via a clock control bus so that the clock sources generate clock signals with frequencies based on the DCVS level requests received from the cores, respectively. Additionally, based on the DCVS level requested by the memory cores 562, 564, 568, and 570, the DCVS controller 580 controls the states of the power multiplexers mux-1, mux-2, mux-3, and mux-4 via the multiplexer control bus, respectively. Further, the DCVS controller 580 sends instructions to the PMIC controller 515 to set the corresponding voltage levels for the various power rails MX-1 to MX-4 and CX based on the requested DCVS levels.

Figure 7:
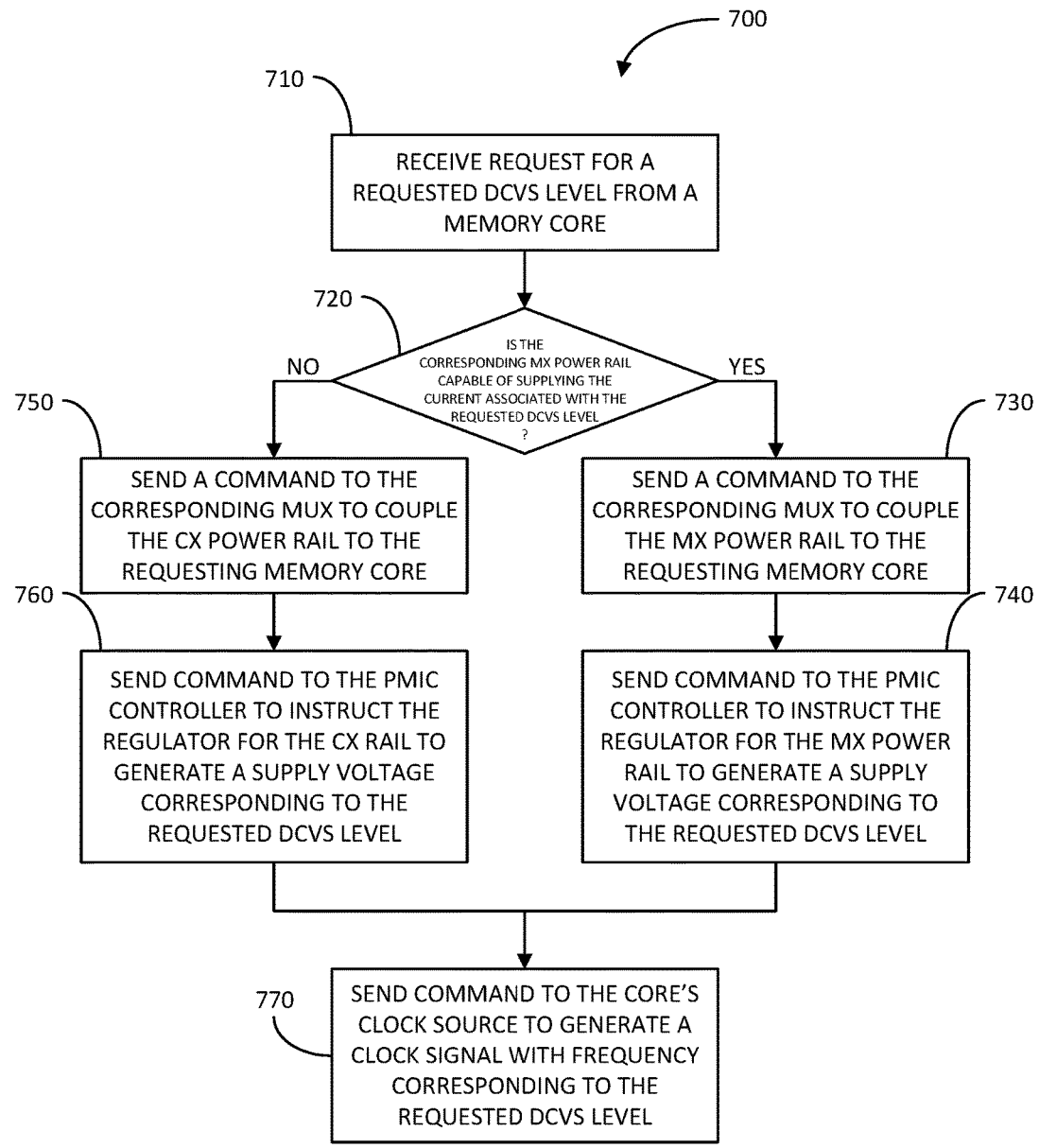
FIG. 7 illustrates a flow diagram of an exemplary method of managing power supplied to a core in accordance with another aspect of the disclosure.

FIG. 7 illustrates a flow diagram of an exemplary method 700 of managing power supplied to the cores in accordance with another aspect of the disclosure. In this example, the method 700 may be performed by the DCVS controller 580 to set appropriate DCVS levels for requesting cores.

According to the method 700, the DCVS controller 580 receives a request for a particular DCVS level from a memory core via the power control bus (block 710). In response, the DCVS controller 580 determines whether the corresponding MX power rail is capable of supplying current associated with the requested DCVS level (block 720).

If the DCVS controller 580 determines that the MX power rail is capable of supplying the current associated with the requested DCVS level, the DCVS controller 580 sends a command to the corresponding power multiplexer to couple the MX power rail to the requesting memory core (block 730). The DCVS controller 580 also sends a command to the PMIC controller 515 to instruct the regulator for the MX power rail to generate a supply voltage corresponding to the requested DCVS level (block 740). Additionally, the DCVS controller 580 sends a command to the core's clock source to generate a clock signal with a frequency corresponding to the requested DCVS level (block 770).

If, on the other hand, the DCVS controller 580, in block 720, determines that the MX power rail is not capable of supplying the current associated with the requested DCVS level, the DCVS controller 580 sends a command to the corresponding power multiplexer to couple the CX power rail to the requesting memory core (block 750). Further, the DCVS controller 580 sends a command to the PMIC controller 515 to instruct the regulator for the CX power rail to generate a supply voltage corresponding to the requested DCVS level (block 760). Additionally, the DCVS controller 580 sends a command to the core's clock source to generate a clock signal with a frequency corresponding to the requested DCVS level (block 770).

Figure 8A:
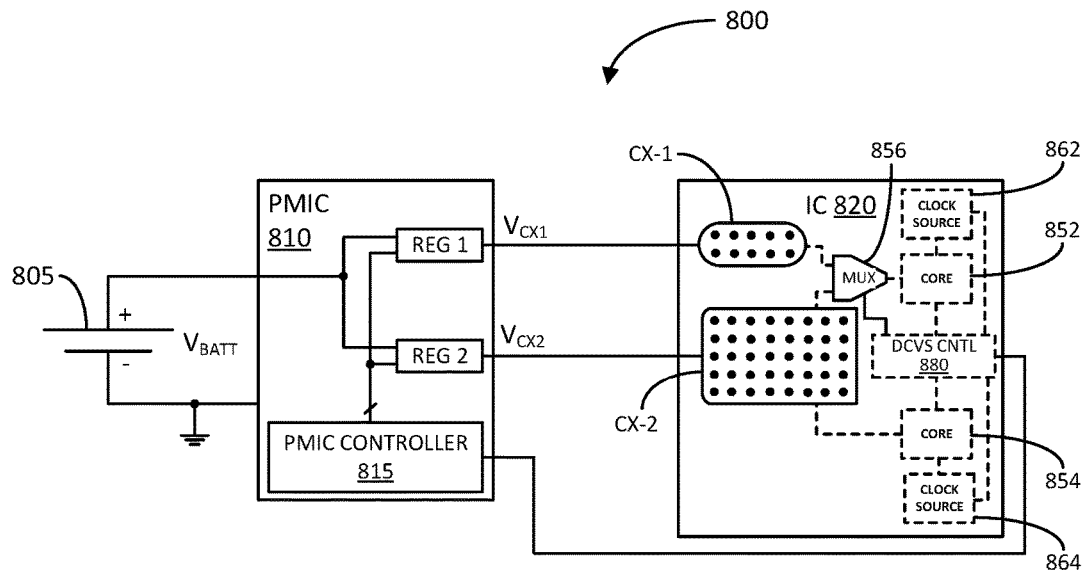
FIG. 8A illustrates a block diagram of another exemplary power delivery network (PDN) in accordance with another aspect of the disclosure.

FIG. 8A illustrates a block diagram of an exemplary power delivery network (PDN) 800 in accordance with another aspect of the disclosure. In the previously-discussed PDNs 100 and 500, the IC includes specific types of cores, such as several memory cores and a processor core. It shall be understood that the concepts described herein apply to any type of cores. Accordingly, in PDN 800, an IC is described with general cores. Additionally, in the previously-discussed PDNs 100 and 500, there are five (5) cores in the IC. It shall be understood that the concepts described herein apply to an IC having two or more cores. Accordingly, in PDN 800, an IC is described with at least two cores.

In particular, the PDN 800 includes a battery 805, a PMIC 810, and an IC 820. The battery 805 is configured to generate a battery voltage $V_{BATT}$. The PMIC 810 includes regulators REG-1 and REG-2 configured to generate supply voltages $V_{CX1}$ and $V_{CX2}$ from the battery voltage $V_{BATT}$, and a PMIC controller 815 configured to control the levels of the supply voltages $V_{CX1}$ and $V_{CX2}$. The IC 820 includes power rails CX-1 and CX-2 configured to receive the supply voltages $V_{CX1}$ and $V_{CX2}$ from the regulators REG-1 and REG-2 of the PMIC 810, respectively.

The IC 820 includes a power (DCVS) controller 880 configured to: (1) receive requests for DCVS levels from cores 852 and 854; (2) if the DCVS requests comes from core 852, send commands to a power multiplexer 856 to either couple the CX-1 power rail couple the CX-2 power rail to the core 852 based on the DCVS level requests; send commands to the clock sources 862 and 864 to generate clock signals with frequencies corresponding to the requested DCVS levels from the cores 852 and 854, respectively; and send commands to the PMCI controller 815 to set the supply voltages $V_{CX1}$ and $V_{CX2}$ based on requests for selected DCVS levels received from the cores 852 and 854, respectively.

Figure 8B:
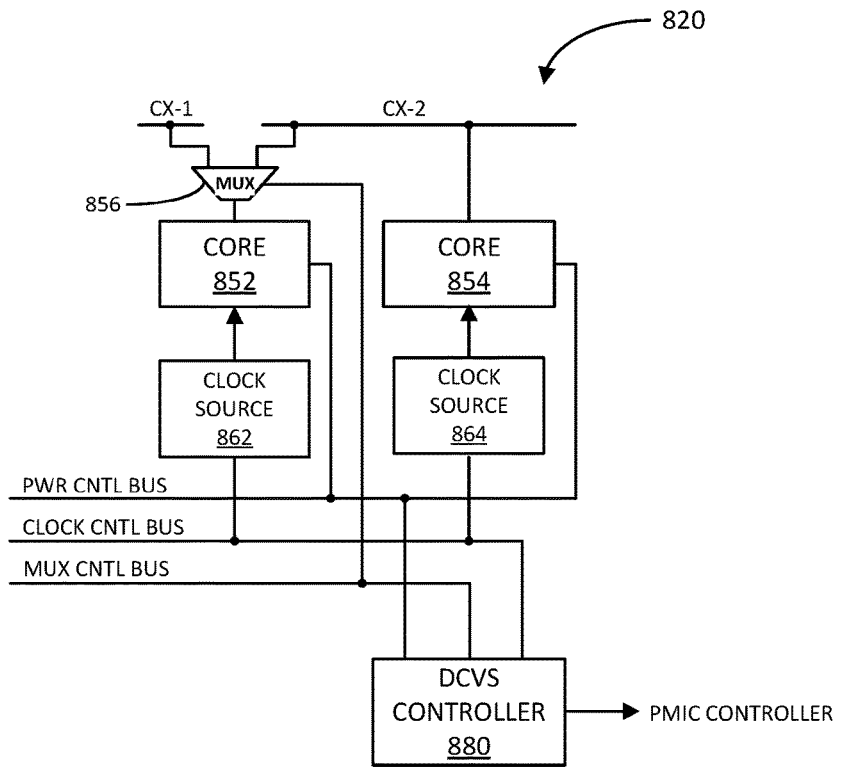
FIG. 8B illustrates a block diagram of an exemplary IC in accordance with another aspect of the disclosure.

FIG. 8B illustrates a block diagram of the exemplary IC 820 in accordance with another aspect of the disclosure. As illustrated, the DCVS controller 880 receives requests for DCVS levels from cores 852 and 854 via a power control bus. The DCVS controller 880 sends commands to the power multiplexer 856 via a multiplexer control bus. The DCVS controller 880 sends commands to clock sources 862 and 864 via a clock control bus. And, the DCVS controller 880 sends external commands to the off-chip PMCI controller 815 (e.g., may not be implemented on the IC 820).

Figure 9:
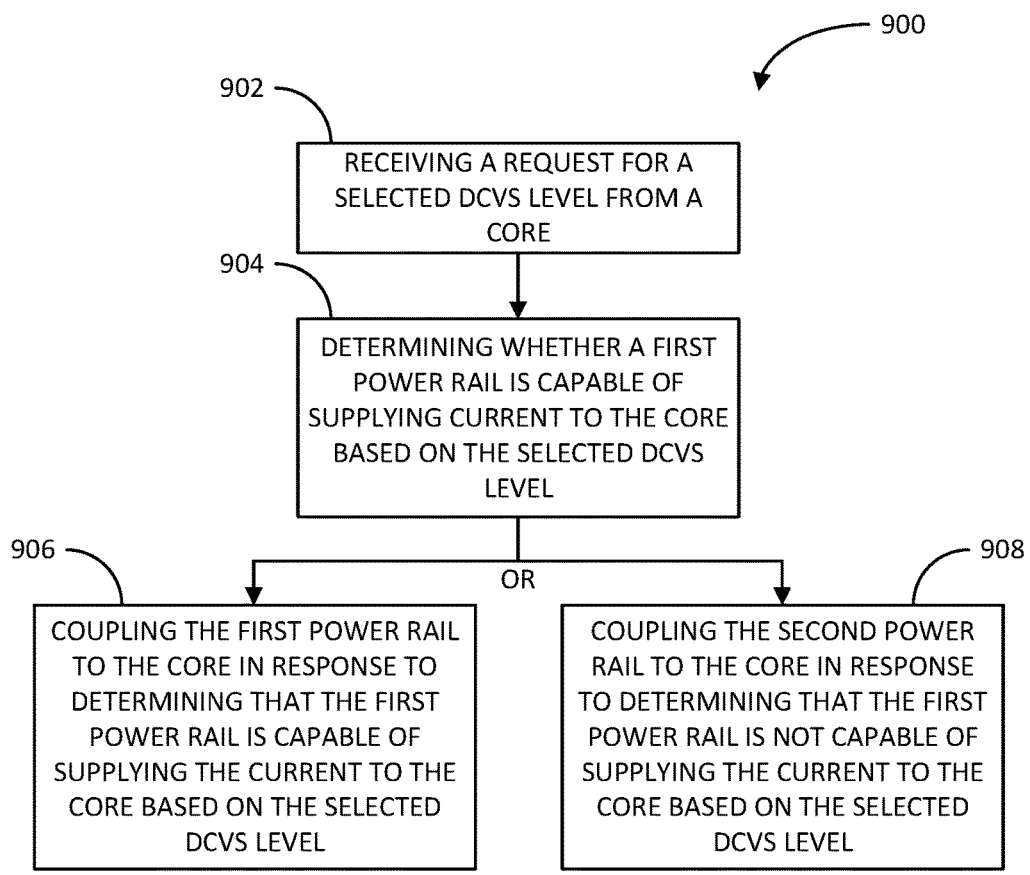
FIG. 9 illustrates a flow diagram of another exemplary method of managing power supplied to a core in accordance with another aspect of the disclosure.

FIG. 9 illustrates a flow diagram of an exemplary method 900 of managing power supplied to a core in accordance with another aspect of the disclosure. The method 900 includes receiving a request for a selected DCVS level from a core (block 902). Examples of means for receiving a request for a selected DCVS level from a core include any of the power (DCVS) controllers described herein.

The method 900 further includes determining whether a first power rail is capable of supplying current to the core based on the selected DCVS level (block 904). Examples of means for determining whether a first power rail is capable of supplying current to the core based on the selected DCVS level include any of the power (DCVS) controllers described herein.

Additionally, the method 900 includes coupling the first power rail to the core in response to determining that the first power rail is capable of supplying current to the core based on the selected DCVS level (block 906). Examples of means for coupling the first power rail to the core in response to determining that the first power rail is capable of supplying current to the core based on the selected DCVS level include any of the power multiplexers described herein.

The method 900 also includes coupling a second power rail to the core in response to determining that the first power rail is not capable of supplying current to the core based on the selected DCVS level (block 908). Examples of means for coupling a second power rail to the core in response to determining that the first power rail is not capable of supply current to the core based on the selected DCVS level include any of the power multiplexers described herein.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus, comprising:
    a core;
    a first power rail configured to supply current to the core based on one of a first set of dynamic clock voltage scaling (DCVS) levels, wherein the first power rail is further configured to supply the current to the core up to a first maximum current;
    a second power rail configured to supply current to the core based on one of a second set of DCVS levels, wherein the second set of DCVS levels is different than the first set of DCVS levels, and wherein the second power rail is further configured to supply the current to the core up to a second maximum current greater than the first maximum current;
    a multiplexer including a first input and a second input coupled respectively to the first power rail and the second power rail, and an output coupled to the core; and
    a DCVS controller configured to:
        receive a request for a selected DCVS level from the core;
        determine whether the first power rail is capable of supplying current to the core based on the selected DCVS level and the first maximum current; and
        control the multiplexer to couple the first input to the output in response to determining that the first power rail is capable of supplying current to the core based on the selected DCVS level and the first maximum current; or
        control the multiplexer to couple the second input to the output in response to determining that the first power rail is not capable of supply current to the core based on the selected DCVS level and the first maximum current.

2. The apparatus of claim 1, wherein the second set of DCVS levels include all of the first set of DCVS levels.

3. The apparatus of claim 1, further comprising a clock source configured to generate a clock signal for the core, wherein the DCVS controller is configured to send a command to the clock source to set a frequency of the clock signal based on the selected DCVS level.

4. The apparatus of claim 1, further comprising a power management integrated circuit (PMIC), comprising:
    a first regulator configured to generate a first supply voltage for the first power rail;
    a second regulator configured to generate a second supply voltage for the second power rail; and
    a PMIC controller configured to control the first and second regulators.

5. The apparatus of claim 4, wherein the DVCS controller is configured to send a command to the PMIC controller to control the first regulator to generate the first supply voltage based on the selected DCVS level in response to the first power rail being capable of supplying current to the core based on the selected DCVS level.

6. The apparatus of claim 4, wherein the DVCS controller is configured to send a command to the PMIC controller to control the second regulator to generate the second supply voltage based on the selected DCVS level in response to the first power rail not being capable of supplying current to the core based on the selected DCVS level.

7. The apparatus of claim 1, wherein the first power rail includes a first set of ball grid array (BGA) balls disposed on a first metalized pad on an integrated circuit (IC) package, wherein the second power rail includes a second set of BGA balls disposed on a second metalized pad on the IC package, wherein a number of BGA balls in the second set is greater than a number of BGA balls in the first set.

8. A method, comprising:
    receiving a request for a selected DCVS level from a core;
    determining whether a first power rail is capable of supplying current to the core based on the selected DCVS level and a maximum current associated with the first power rail; and
    coupling the first power rail to the core in response to determining that the first power rail is capable of supplying current to the core based on the selected DCVS level and the maximum current; or
    coupling a second power rail to the core in response to determining that the first power rail is not capable of supplying current to the core based on the selected DCVS level and the maximum current.

9. The method of claim 8, further comprising generating a clock signal for the core, wherein a frequency of the clock signal is based on the selected DCVS level.

10. The method of claim 8, further comprising generating a first supply voltage based on the selected DCVS level in response to the first power rail being capable of supplying current to the core based on the selected DCVS level and the maximum current, wherein the first supply voltage is applied to the first power rail.

11. The method of claim 8, further comprising generating a second supply voltage based on the selected DCVS level in response to the first power rail not being capable of supplying current to the core based on the selected DCVS level and the maximum current, wherein the second supply voltage is applied to the second power rail.

12. An apparatus, comprising:
    means for receiving a request for a selected DCVS level from a core;
    means for determining whether first power rail is capable of supplying current to the core based on the selected DCVS level and a maximum current associated with the power rail; and
    means for coupling the first power rail to the core in response to determining that the first power rail is capable of supplying current to the core based on the selected DCVS level and the maximum current; or
    means for coupling a second power rail to the core in response to determining that the first power rail is not capable of supplying current to the core based on the selected DCVS level and the maximum current.

13. The apparatus of claim 12, further comprising means for generating a clock signal for the core, wherein a frequency of the clock signal is based on the selected DCVS level.

14. The apparatus of claim 12, further comprising means for generating a first supply voltage based on the selected DCVS level in response to the first power rail being capable of supplying current to the core based on the selected DCVS level and the maximum current, wherein the first supply voltage is applied to the first power rail.

15. The apparatus of claim 12, further comprising means for generating a second supply voltage based on the selected DCVS level in response to the first power rail not being capable of supplying current to the core based on the selected DCVS level and the maximum current, wherein the second supply voltage is applied to the second power rail.

* * * * *